United States Patent [19]
Byers

[11] Patent Number: 5,313,337
[45] Date of Patent: May 17, 1994

[54] ATTACHABLE VEHICLE MIRROR

[76] Inventor: Thomas L. Byers, 5840 Stewart Dr., Mustang, Okla. 73064

[21] Appl. No.: 6,765

[22] Filed: Jan. 21, 1993

[51] Int. Cl.⁵ .................. B60R 1/08; G02B 7/182
[52] U.S. Cl. .................................. 359/872; 248/467; 248/206.3
[58] Field of Search ............ 359/871, 872; 248/467, 248/206.3, 479, 302

[56] References Cited

U.S. PATENT DOCUMENTS

| | | |
|---|---|---|
| 1,684,560 | 9/1928 | Scott .................. 248/479 |
| 2,856,814 | 10/1958 | Dillmann . |
| 2,880,651 | 4/1959 | Fenyo . |
| 2,915,944 | 12/1959 | Butts .................. 248/467 |
| 3,305,202 | 2/1967 | Christenson . |
| 3,542,456 | 11/1970 | Huge . |
| 3,701,507 | 10/1972 | Bell . |
| 4,624,539 | 11/1986 | King et al. . |
| 4,925,287 | 5/1990 | Lord et al. . |
| 4,951,913 | 8/1990 | Quesada .................. 359/872 |
| 5,039,046 | 8/1991 | Brewster .................. 248/206.3 |
| 5,111,342 | 5/1992 | Quesada . |

Primary Examiner—Edward K. Look
Assistant Examiner—James A. Larson
Attorney, Agent, or Firm—Dougherty, Hessin, Beavers & Gilbert

[57] ABSTRACT

An attachable rear viewing vehicle mirror for viewing inaccessible areas about a motor vehicle. The device consists of a uniplanar support frame attachable by suction cups and extending support arms at an obtuse angle thereto for adjustably supporting a wide angle mirror.

4 Claims, 3 Drawing Sheets

ATTACHABLE VEHICLE MIRROR

BACKGROUND OF THE INVENTION

1. Field of the Invention

The present invention relates to a device that can be temporarily placed on a vehicle to provide visual contact with inaccessible zones and, more particularly, but not by way of limitation, it relates to an improved type of attachable mirror for positioning on or about a vehicle to encapture a trailer hitch or the like within the field of view during hook-up procedure.

2. Prior Art

There have been a number of devices developed in the past for use in providing a view of inaccessible areas in or about a vehicle. Indeed, the necessity for viewing a trailer hitch during trailer attachment operations has necessitated a number of variations. U.S. Pat. No. 4,925,287 discloses a multi-pod device wherein a plurality of pods or legs are attachable by suction cup to the vehicle external surfaces to support an adjustable arm which supports a reflection device as directed toward a trailer hitch or other point of interest. The reflecting device is a paraboloid type of mirror which provides greater than one-to-one field of view coverage so that visual coverage is supplied for an associated hitch and trailer tongue during hook-up.

U.S. Pat. No. 5,111,342 provides another type of hitch-viewing mirror assembly which uses a combination of suction cups and anchor points to affix a supporting frame on or about a vehicle. The supporting frame supports an adjustable viewing device in proper field of view to include the hitch and surrounds. This device utilizes both suction cups and other latch-type connecting arms of adjustable type so that the device can be installed on various types of vehicle, i.e., pickups, station wagons, and the like. U.S. Pat. No. 4,624,539 discloses a portable mirror device for rear view observation that also attaches by means of suction cup to glass or other smooth surface to support a conventional spring clip which is also attached to an adjustable viewing device.

SUMMARY OF THE INVENTION

The present invention is an improvement on attachable rear-view vehicle mirrors that are adaptable to allow the driver to maintain continual visual contact with a vehicle trailer hitch and vehicle tongue during the hook-up operation. The present invention utilizes a support frame which carries a plurality of spaced suction cups while extending parallel support arms at an angle therefrom. The support arms carry a viewing mirror, preferably an arcuate type, wide angle mirror, which is adjustably secured at the outer end of the support arms. Thus, the support frame can be positioned with its plural suction cups engaged on or about the rear end of a pickup, station wagon, sedan, coupe or other utility vehicle having rear viewing access, and being so positioned with the support arms extending rearward from the trailing edge of the vehicle, whereupon the adjustable mirror carried by the support arms can be secured at proper angle to deflect the driver's view downward to the hitch/tongue area.

Therefore, it is an object of the present invention to provide an adjustable rear viewing device that can be attachably utilized on any type of vehicle to provide view of a rearward position.

It is also an object of the present invention to provide such a hitch viewing attachable mirror that is simple of construction yet extremely rugged and reliable in usage.

It is yet further an object of the present invention to provide an attachable mirror device that is readily and safely stowed in vehicle storage compartments.

Finally, it is an object of the present invention to provide vehicle rear hitch viewing capability without need for undue appurtenant structure on vehicle and/or trailer components.

Other objects and advantages of the invention will be evident from the following detailed description when read in conjunction with the accompanying drawings which illustrate the invention.

DETAILED DESCRIPTION OF THE INVENTION

Figure 1:
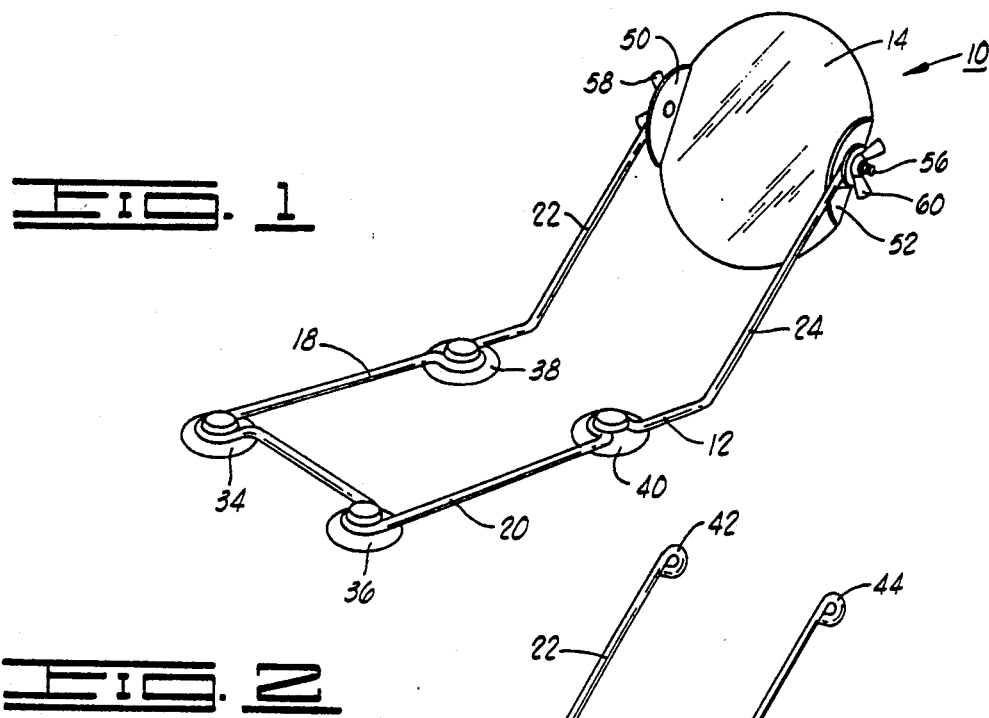
FIG. 1 is a perspective view of the attachable mirror device.
Figure 2:
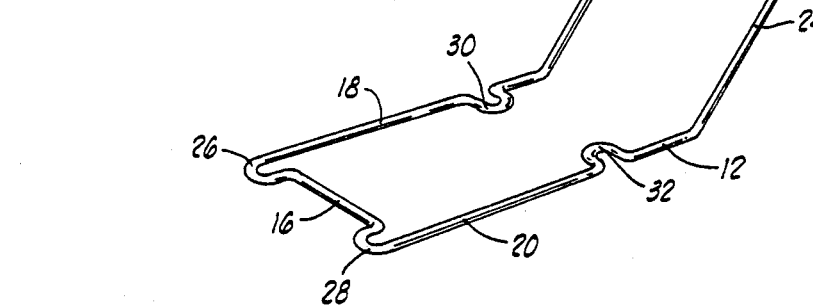
FIG. 2 is a similar perspective view of the support frame of the device.

Referring to FIG. 1, a detachable vehicle rear-viewing mirror 10 consists of a support frame 12 supporting an adjustable mirror 14. Referring also to FIG. 2, the support frame 12 is formed from stiff, heavy gauge steel wire, e.g., 0.187 inch diameter, which is bent to form a base portion 16 including side rails 18 and 20 that extend in parallel at a selected angle as respective support arms 22 and 24. U-shaped bend formations 26 and 28 are formed on the corners of base portion 16 and U-shape bends 30 and 32 are formed in respective side rails 18 and 20. Each of the U-shaped bends 26, 28, 30 and 32 define a slot opening on the order of ⅜ inch which functions to receive securely the capture buttons of respective suction cups 34, 36, 38 and 40 as shown in FIG. 1.

The respective side rails 18 and 20 are then further bent at an upward angle of approximately 120° to extend the support arms 22 and 24, each of which is terminated in a respective eye loop 42 and 44 defining approximately a ⅜ inch inside diameter. The adjustable mirror 14 as shown in FIGS. 3 and 4 may then be adjustably secured between loops 42 and 44 to provide any desired viewing angle.

Figures 3, 4:
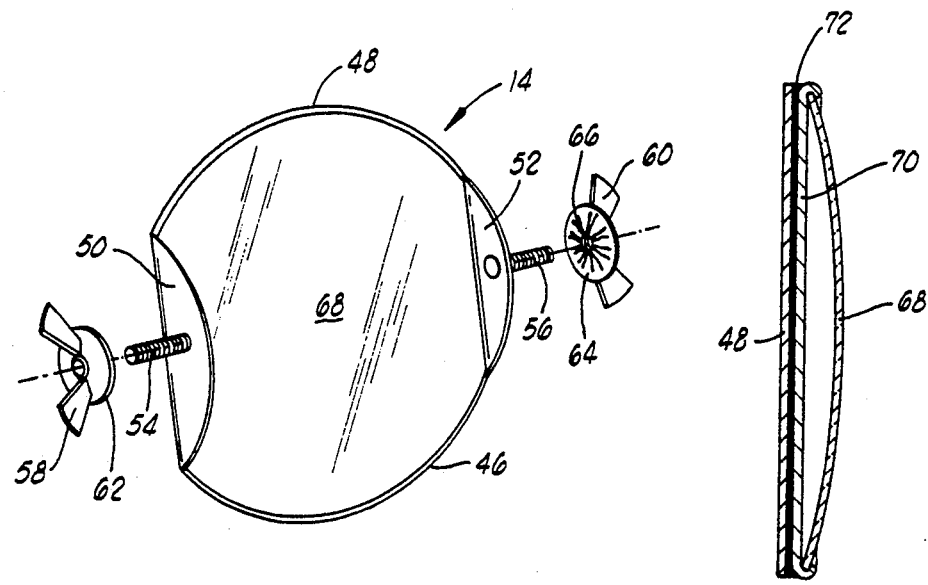
FIG. 3 is a view in perspective of the mirror bracket of the present invention with securing ring nuts exploded.
FIG. 4 is a vertical cross section of the mirror as mounted on the mounting bracket.

Referring to FIGS. 3 and 4, a gimble bracket 46 is formed with a generally round central plate 48 having opposite side tabs 50 and 52 formed by 90° folding of the central plate 48. The opposite side tabs 50 and 52 are each folded perpendicular so that they are parallel each to the other and respective press-serts 54 and 56 are press fit into the tabs 50, 52 so that they extend outward in axial alignment. The threaded press-serts 54 and 56 are each adapted to be received through the eye loops 42 and 44, respectively, whereupon the mirror position can be secured by fastening with thumb screws 58 and 60. Each of thumb screws 58 and 60 is a commercially available type having unitary collar washer 62 and 64, respectively, and a plurality of radial striations 66 provides secure locking engagement relative to the respective wire loops 42 and 44.

A commercially available type of arcuate mirror may be employed as viewing mirror 68. A shown in FIG. 4, a satisfactory type of mirror 68 is an arcuate type formed with a thirteen inch radius bend and retained within a suitable metal backing plate 70. The mirror is mounted by securing the backing plate 7 against the gimble bracket central plate 48 by means of a suitable permanent bonding agent 72.

In operation, the support frame 12 can be positioned on or about a vehicle by press-fitting the plurality of suction cups 34-40 at a position wherein the mirror 14 is suspended in alignment as required. Thereafter, the thumbscrews 58 and 60 may be loosened to adjust the angle of mirror 14 relative to the exact field of view. When adjusted, the operator merely tightens the thumb screws 58 and 60 as the radial striations 66 bearing on eye loops 42 and 44 maintain the mirror 14 in rigid position.

Figure 5:
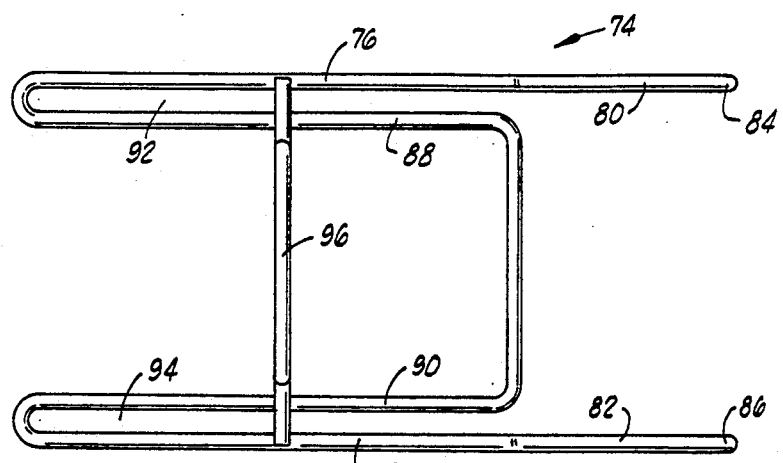
FIG. 5 is a top plan view of an alternate form of support frame for use in the present invention.
Figure 6:
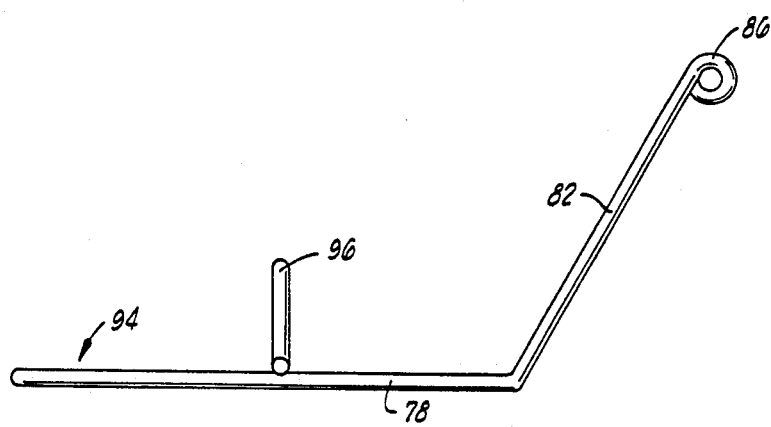
FIG. 6 is a side view in elevation of the support frame of FIG. 5.

FIGS. 5 and 6 illustrate an alternative form of support frame which also allows adjustment in the positioning of the plurality of suction cups relative to the device. In this case, a support frame 74 is formed with opposite side rails 76 and 78 bent upward at approximately 120° to form support arms 80 and 82 which terminate in eye loops 84 and 86. The inner or connecting end of side rails 76 and 78 is then bent inward to form parallel inner rails 88 and 90 which define respective longitudinal tracks 92 and 94. The slots or tracks 92 and 94 then enable one or more suction cup top capture buttons to be inserted therein and easily manipulated to desired positions by twisting. Cross rail 96 maintains parallelism of inner rails 88 and 90 as it is securely welded to each of the opposite side rails 76 and 78 and the inner rails 88 and 90. The operation of the FIG. 5 support frame is the same as that of FIG. 1 except that it allows adjustment of the suction cup positioning.

Figure 7:
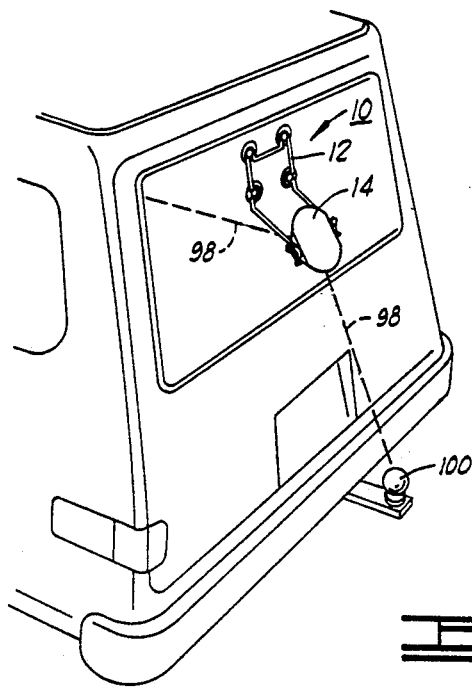
FIG. 7 is a perspective view of a portion of a station wagon type vehicle with the rear view mirror device mounted thereon.

FIG. 7 illustrates a typical application wherein the mirror device 10 is used on the back window of a station wagon type of vehicle. Thus, the support frame 12 is secured centrally with all four suction cups on the rear window glass and mirror 14 adjusted to project generally along the line of sight indicated by dash line 98. Thus, viewing line 98 may extend from the rear viewing driver or from the rear view mirror back onto the arcuate reflecting side of mirror 14 and downward toward the trailer ball 100.

Figure 8:
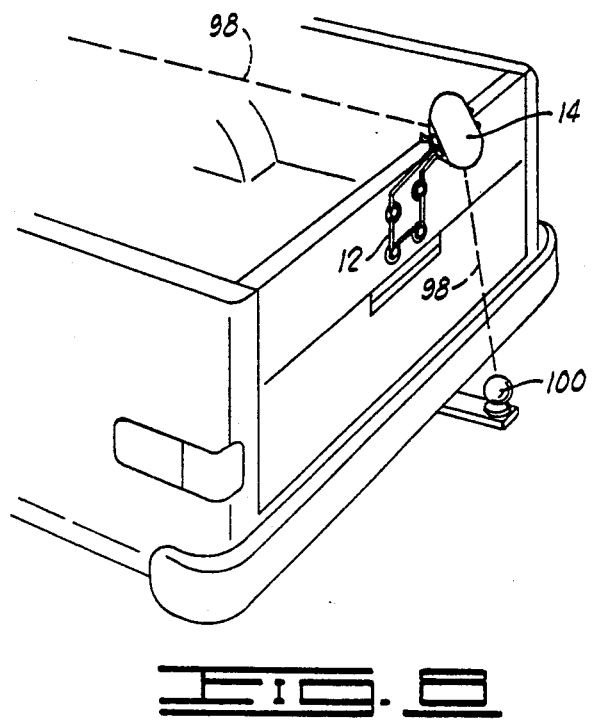
FIG. 8 is a perspective view of a rear portion of a pickup vehicle with the device mounted thereon.
Figure 9:
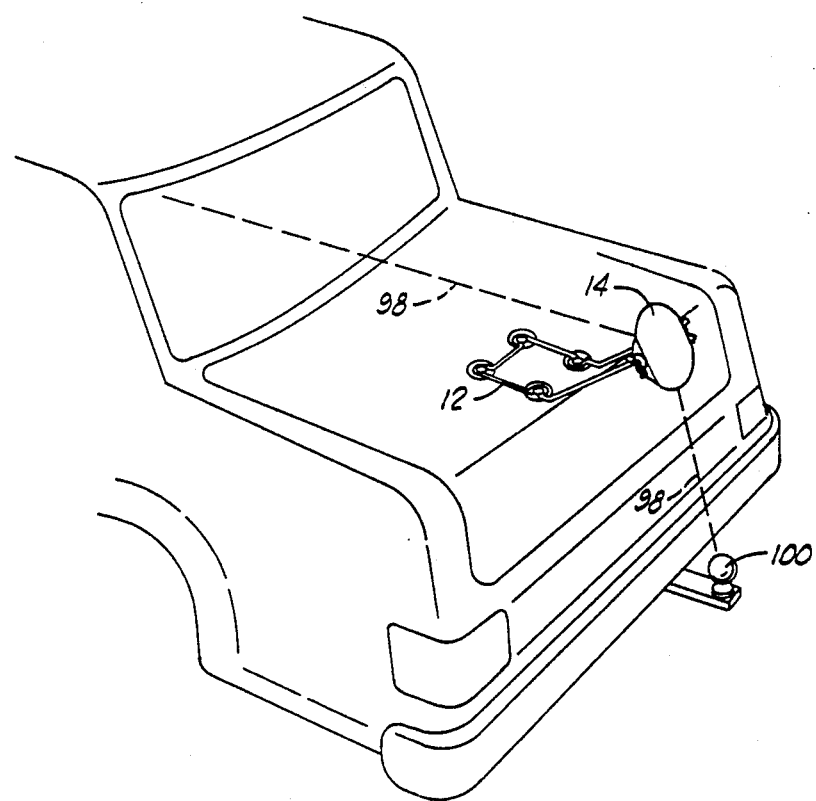
FIG. 9 is a perspective view of a type of vehicle having a rear trunk with the mirror device mounted thereon.

FIG. 8 illustrates the mirror device 10 as it is placed on the back of a pickup, i.e., at a suitable place on the tailgate, with the mirror 14 secured to reflect the line of sight 98 from the pickup cab downward toward the trailer ball 100 on the pickup hitch. The similar capability is exhibited for a coupe or sedan type of automobile having a rear deck or trunk top as the support frame 12 is secured by suction cups to the top of the trunk with mirror 14 secured at the proper angle to deflect rear viewing line of sight 98 downward toward trailer ball 100.

The foregoing discloses a novel form of attachable rear viewing mirror that is suitable for surveillance of rearward trailer hitching operations thereby to enable more safe and rapid hook-up of trailing implements and the like. The device is of relatively simple construction yet rugged and reliable in operation so that the device can be stored in or about the vehicle when not in use with minimal chance of damage or breakage, yet the device can be quickly brought from storage and secured to a vehicle in proper place to enable the particular rear-viewing field of view.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An attachable rear viewing device for motor vehicles, comprising:
   a support frame consisting of a unitary wire frame formed to have first and second parallel side rails and an end rail in a first plane having plural suction cups retained thereon in a uniplanar array;
   first and second support arms extending at an angle of approximately 120° and in parallel from said support frame;
   first and second eye loops formed on said respective first and second support arms;
   a mirror having first and second opposite side, axially aligned, threaded posts which are received in said respective first and second eye loops; and
   first and second thumb screws threadedly received on said respective threaded posts to adjust and secure the angle of reflectance of said mirror relative to said support frame.

2. An attachable rear viewing device as set forth in claim 1 wherein said mirror comprises:
   an arcuate, wide angle reflectance device.

3. An attachable rear viewing device as set forth in claim 1 which further includes:
   plural U-shaped bends formed at spaced points on said end rail and said first and second parallel side rails for retaining said plural suction cups.

4. An attachable rear viewing device as set forth in claim 1 wherein:
   said first and second parallel side rails each has folded, parallel inner rails, said plural suction cups being movably retained between said side rails and respective inner rails, said side rails each extending into said first and second support arms.

* * * * *